Patented Nov. 30, 1937

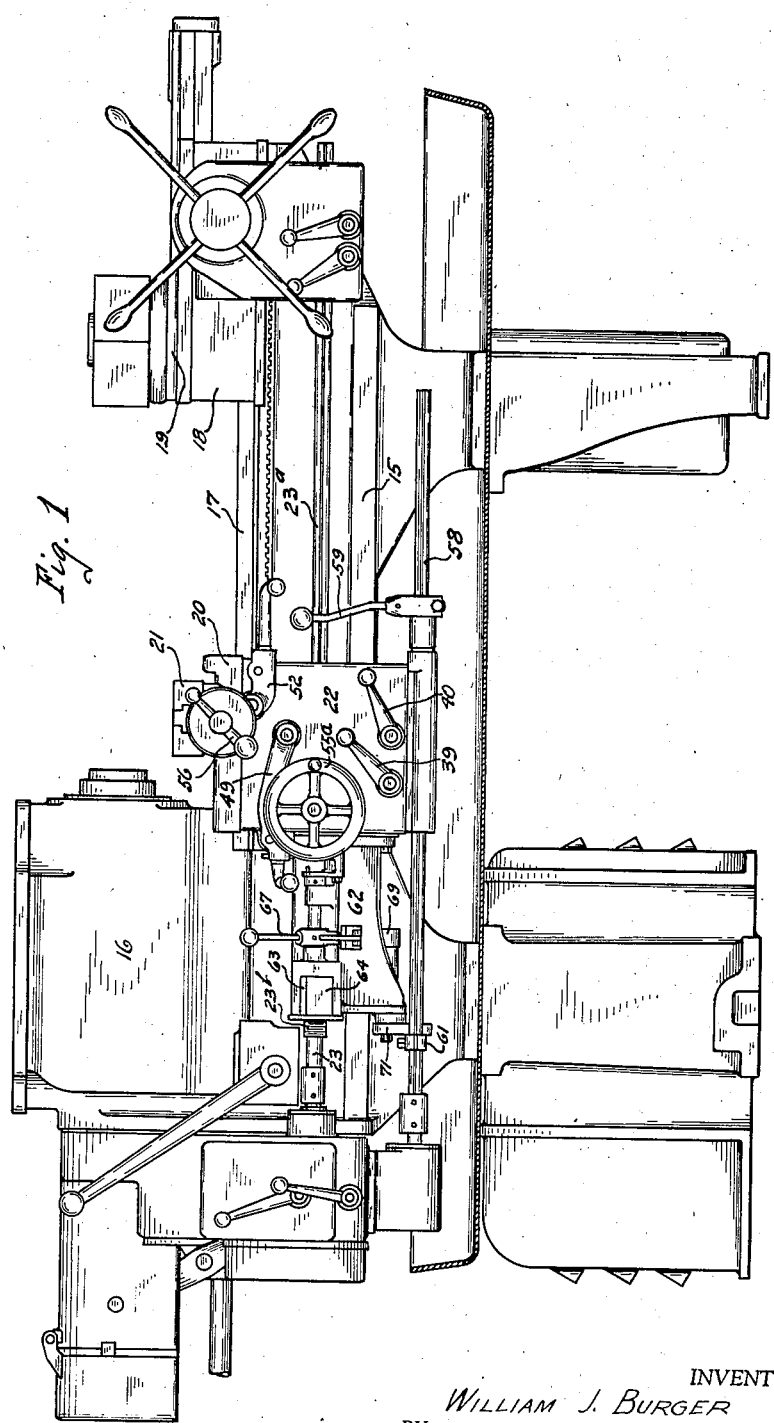

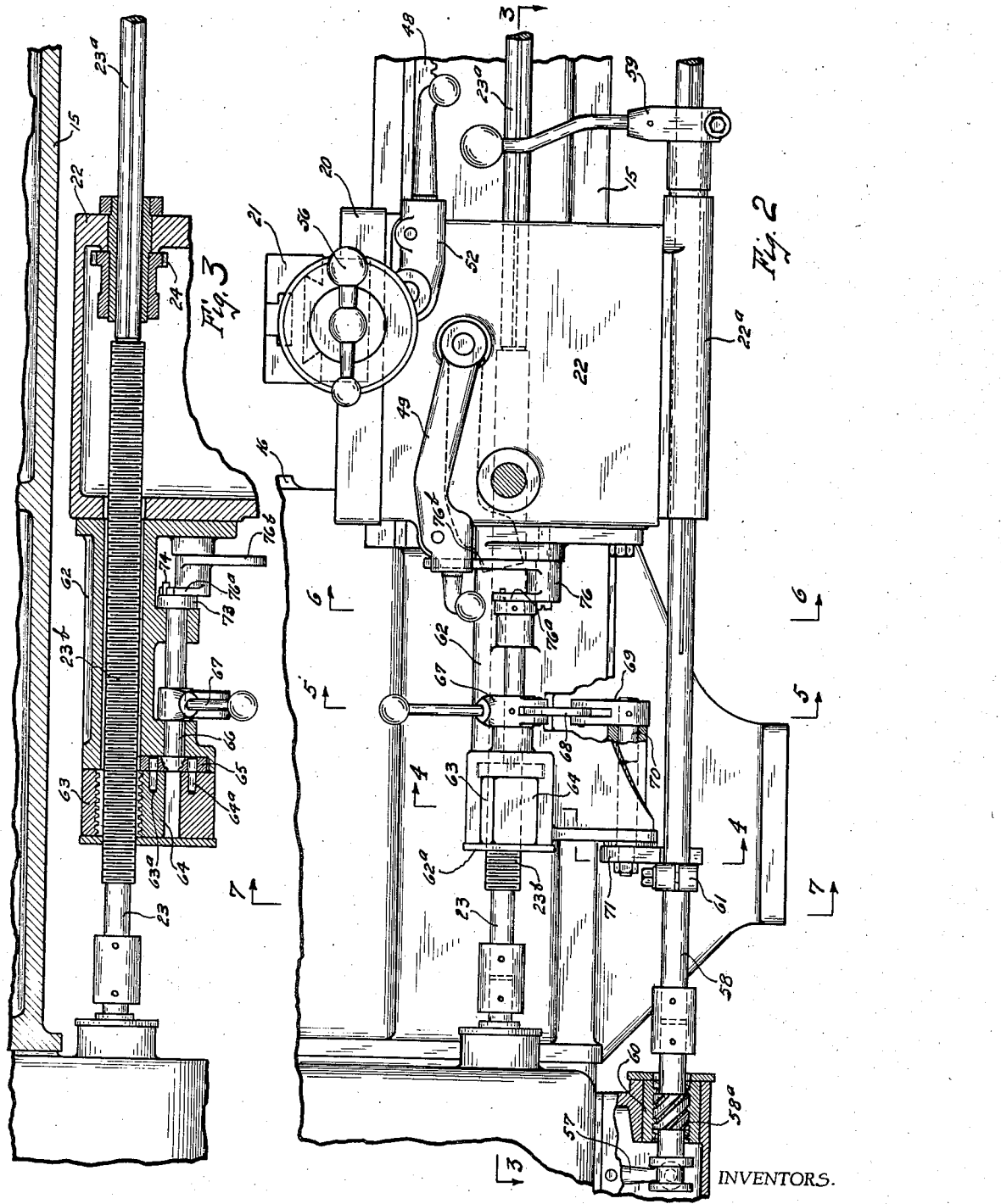

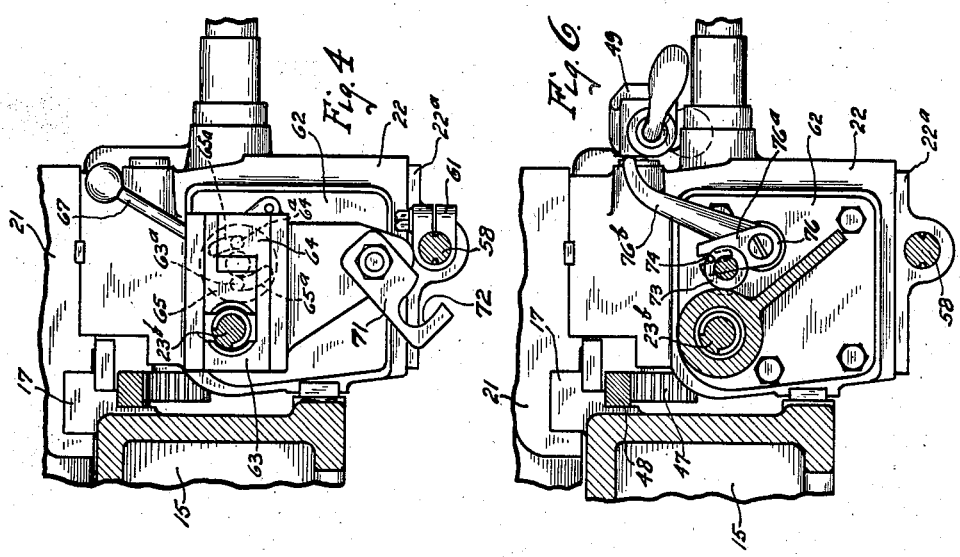
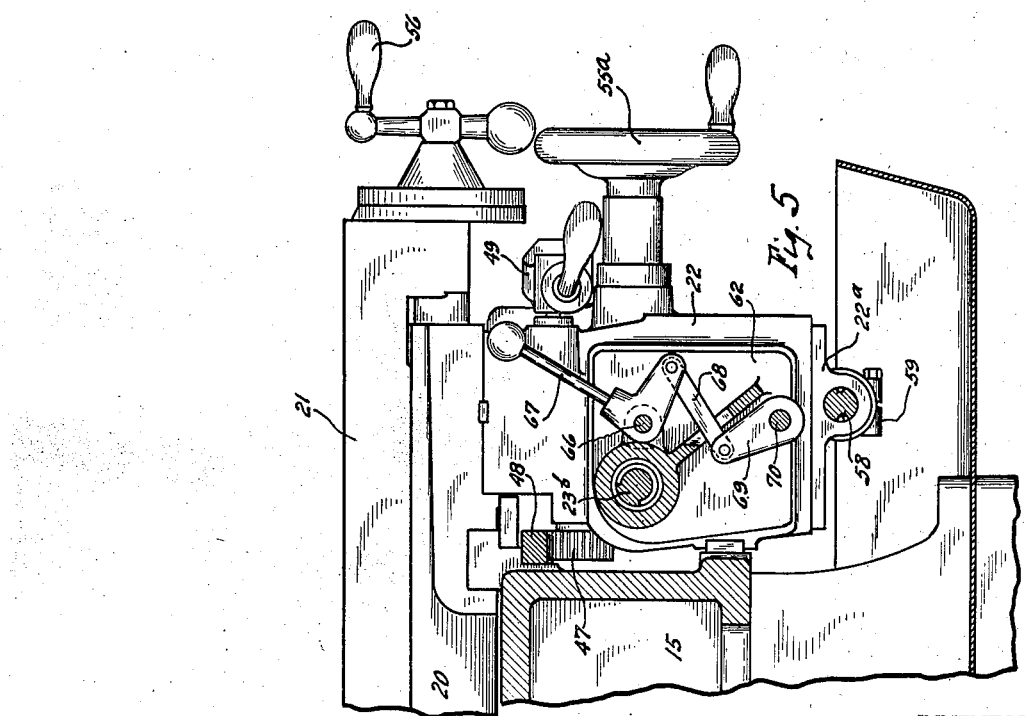

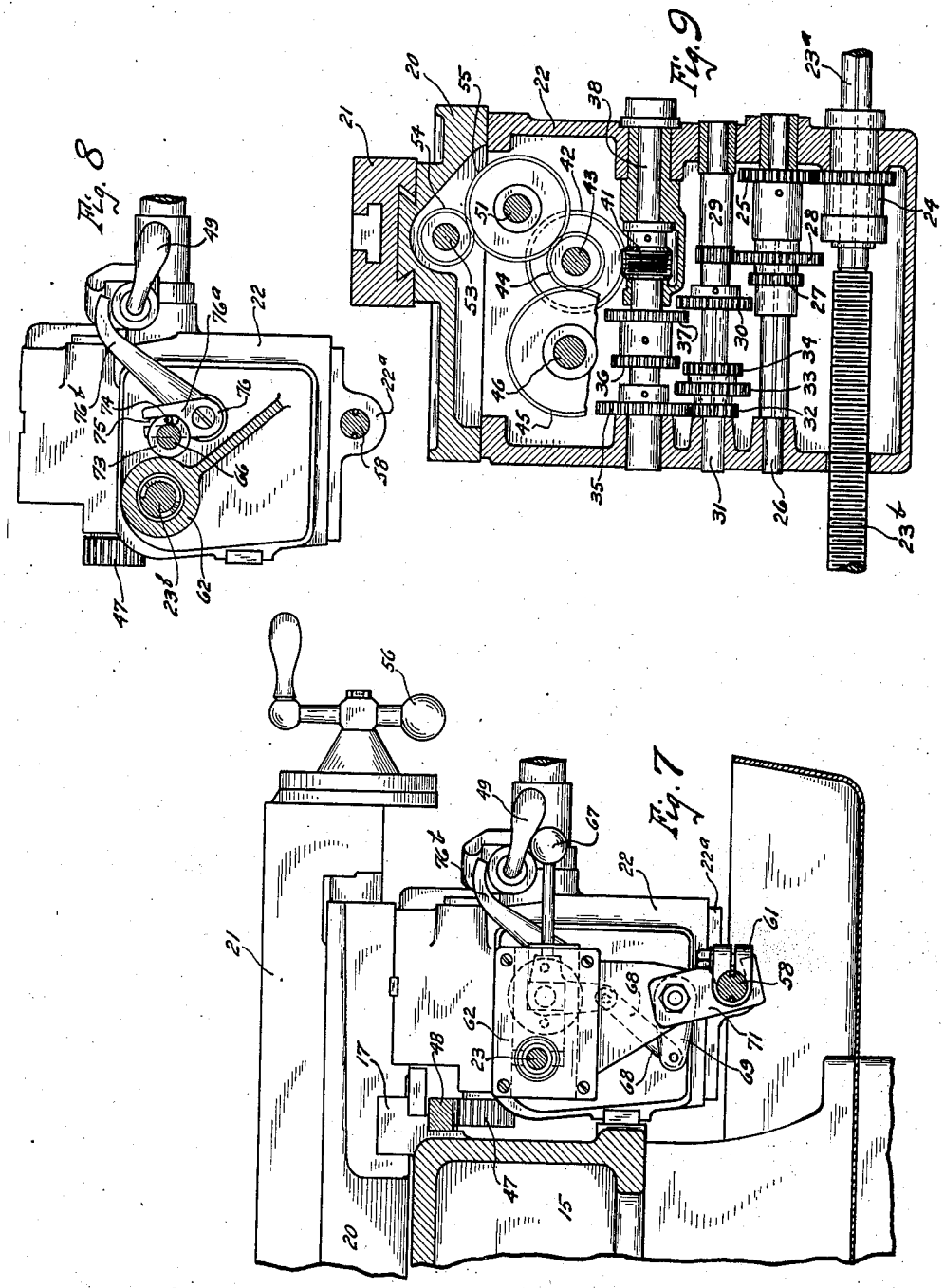

2,100,899

UNITED STATES PATENT OFFICE 2,100,899

MACHINE TOOL

William J. Burger, Shaker Heights, and Chrysanth M. Mirossay, Cleveland, Ohio, assignors to The Warner & Swasey Company, Cleveland, Ohio, a corporation of Ohio Application September 18, 1936, Serial No. 101,454

12 Claims. (Cl. 82—5)

This invention relates to a machine tool and particularly to a machine tool wherein there is a power feed for a turret slide and cross-slide carriage and, in addition, a power feed for the cross-slide, together with provision for chasing or producing threads on the work.

An object of the invention is to provide a machine tool of the character above specified wherein accurate threads can be chased or produced in addition to imparting the usual feeding movements to the turret slide, cross-slide carriage, and cross slide.

Another object is to provide a machine tool of the character specified wherein a single shaft is provided having an unthreaded splined portion for producing the feeding movements and a threaded non-splined portion for producing the threading movements.

Another object is to provide in a machine tool of the character specified provision whereby the cross-slide carriage may move its entire working distance during either a threading operation or a feeding movement, wherefore threads may be chased or produced by the carriage, which equal in length the maximum feeding movement of the carriage.

Another object is to provide a machine tool of the character specified and wherein an interlock is provided between the control member for the threading means and the control member for the feeding means, wherefore the control member for the threading means cannot be actuated during a feeding movement and the control member for the feeding means cannot be actuated during a threading operation.

Another object is to provide in a machine tool of the character specified in the last three objects enumerated, means whereby the half nuts which engage the threaded portion of the shaft are carried by an exterior extension of the apron of the cross-slide carriage, while the gear for the feeding movements and which cooperates with the non-threaded splined portion of the shaft is located within the apron.

Another object is to provide in a machine tool of the character hereinbefore specified and having an end-wise movable and rockable control shaft for controlling the threading and feeding movements of the machine, a single control mechanism for controlling the opening and closing of the half nuts, for automatically stopping the threading movement of the carriage, and for actuating the interlock between the control members for the threading means and the feeding means.

Further and additional objects and advantages not hereinbefore specified will become apparent hereinafter during the detailed description of the invention which is to follow. In the accompanying drawings, Fig. 1 is a front elevational view of a machine tool illustrating an embodiment of the invention.

Fig. 2 is a fragmentary front elevational view on an enlarged scale of the machine shown in Fig. 1 with certain portions thereof shown in section.

Fig. 3 is a sectional view taken substantially on line 3—3 of Fig. 2 looking in the direction of the arrows.

Fig. 4 is a sectional view taken substantially on the irregular line 4—4 of Fig. 2 looking in the direction of the arrows.

Fig. 5 is a sectional view taken substantially on line 5—5 of Fig. 2 looking in the direction of the arrows.

Fig. 6 is a sectional view taken substantially on line 6—6 of Fig. 2 looking in the direction of the arrows.

Fig. 7 is a sectional view taken on line 7—7 of Fig. 2 looking in the direction of the arrows, but illustrating certain of the parts in a different position from the position shown in the previous views.

Fig. 8 is a view similar to Fig. 6 but showing the parts in a different position than that in which they are shown in Fig. 6.

Fig. 9 is a developed view of the gearing in the apron for feeding the cross-slide carriage and cross-slide.

The machine tool shown in Fig. 1 comprises a bed 15 provided with the usual head 16 for the work spindle and longitudinal ways 17 which are parallel to the axial line of the spindle. In this instance an adjustable base 18 for the turret slide 19 is shown in position on the ways 17, while the cross-slide carriage 20 is slidable upon the ways 17 intermediate the base 18 and the head 16 and said carriage slidably supports the cross-slide 21, as will be well understood. The cross-slide carriage 20 is provided with the usual apron 22 extending downwardly of the front of the bed and housing the feed drive for the carriage and cross-slide and including the change speed gearing as shown in Fig. 9 and later to be referred to more in detail.

Ordinarily the feeding drive to the cross-slide carriage and cross-slide, as well as to the turret slide, is imparted to such members by a feed shaft which is operatively connected through suitable gearing with the work spindle in the head, as will be well understood in the art. In the present construction a shaft 23 extends longitudinally of the front of the bed and is operatively connected with the work spindle, but this shaft 23 performs the dual function in the present instance of acting as the feed shaft for the turret slide, cross-slide carriage and cross-slide and of providing also the threading movement of the cross-slide carriage 20.

As clearly shown in Fig. 3, the shaft 23 has a splined unthreaded portion 23a for producing the feeding movements and a threaded non-splined portion 23b for producing the threading movements of the cross-slide carriage. The feeding movements of the cross-slide carriage and the cross-slide are imparted thereto by means of change speed gearing located in the apron 22 and now to be described.

The splined unthreaded portion 23a of the shaft 23 carries a gear 24 which is rotatably mounted in the apron but is held against axial movement as clearly shown in Figs. 3 and 9, it being understood that the gear has longitudinal movement relative to the shaft. The gear 24 meshes with a gear 25 fixed to a shaft 26 that is rotatable in the apron, and said shaft has splined thereto for rotation therewith and movement endwise thereof a two-step gear cone formed of the gears 27 and 28. The gear 28 may be meshed with a gear 29 or the gear 27 may be meshed with a gear 30, which gears 29 and 30 are fixed to a shaft 31 rotatable in the apron. The shaft 31 has splined thereto for rotation therewith and movement endwise thereof, a three-step gear cone composed of the gears 32, 33 and 34 which can be meshed respectively with gears 35, 36 and 37 fixed to a shaft 38 also rotatable within the apron. It will be seen that the gearing thus described enables the shaft 38 to be driven by the shaft 23 at six different speeds. The levers 39 and 40 shown in Fig. 1 on the front of the apron 22 control the positioning of the three-step gear cone and two-step gear cone, respectively.

The shaft 38 has fixed thereto a worm 41 which meshes with a worm wheel 42 carried by a shaft 43, rotatably mounted in the apron and extending transversely to the shaft 38. The shaft 43 carries a pinion 44 which meshes with a gear 45 fixed to a shaft 46 parallel to the shaft 43 and having fixed to its inner end a pinion 47 which meshes with the rack 48 that is positioned beneath the front way 17 for imparting the feeding movements to the cross slide carriage as will be well understood. A suitable clutch (not shown) controlled by the lever 49 (see Figs. 1 and 2) connects the pinion 44 to shaft 43 as is common in the art. The shaft 43 has fixed thereto a pinion similar to pinion 44 and said pinion meshes with a gear 55 carried by the shaft 51. A suitable clutch (not shown) controlled by the lever 52 (see Figs. 1 and 2) serves to operatively connect the gear 55 to the shaft 51 to establish the drive from the shaft 43 to the feed screw 53 for the cross-slide, it being noted that said screw has fixed thereto a gear 54 which meshes with the gear 55 carried by the shaft 51. The pinion 47 may be manually rotated by the hand wheel 55a, while the feed screw 53 for the cross-slide may be manually rotated by the crank 56, see Fig. 1. The gearing in the apron and the feed drives for the cross-slide carriage and cross-slide as just described are conventional and well known in the art, but have been referred to herein in order that a clear understanding will be had of the structure later to be described. Substantially the same gearing as described above for moving the cross-slide carriage can be employed in the apron for the turret slide for moving the latter.

As previously stated, the shaft 23 is operatively connected with the work spindle in the head and, as is well known in the art, a suitable clutch (not shown) is located in the gear box on the end of the head for starting, stopping and reversing the rotation of the shaft 23. The clutch just referred to is controlled by means of a pivoted lever 57, see Fig. 2, that is operatively connected to a control shaft 58 mounted on the front of the bed and extending through a bracket 22a fixed to the lower end of the apron 22 whereby the lever 57 can be moved from a neutral position to either one of two operative positions. The bracket 22a rockably supports a lever 59 arranged on the shaft 58 and having a spline connection therewith, whereby the shaft and lever may have relative longitudinal movement. When the shaft 58 is rocked by the lever 59 the said shaft is moved longitudinally endwise by means of a portion 58a having steep threads and engaging a nut 60 fixed in an extension from the gear box on the head as clearly shown in Fig. 2. The lever 59, therefore, controls the forward or reverse rotation of the shaft 23 when said lever is moved inwardly or outwardly with respect to its neutral position, as will be well understood in the art. The shaft 58 has adjustably clamped thereto a stop collar 61 later to be referred to.

The apron 22 is provided on its side adjacent to the head 16 with an extension bracket 62 that is provided adjacent its outer end and upper side with a transverse horizontal slot housing a pair of half nuts 63 and 64 adapted to engage the threaded portion 23b of the shaft 23, see Fig. 4. The end of the slot in which the half nuts are arranged is closed by means of a plate 62a. The half nuts 63 and 64 are provided, respectively, with pins 63a and 64a which engage in camming slots 65a in a disk 65 formed integral with a shaft 66 that is rockably mounted in the bracket 62 (see Figs. 3 and 4). A lever 67 is fixed to the shaft 66 and when said lever is moved from the position shown in Figs. 4 and 5 to the position shown in Fig. 7, the half nuts 63 and 64 are moved from a disengaged position into an engaged position with respect to the threaded portion 23a of the shaft 23. The lever 67 is in the form of a bell crank and the short arm of the bell crank is slotted to receive the end of a link 68 that is pivotally connected thereto. The opposite end of the link 68 is received in and pivotally connected to the fork of a short lever 69 that is fixed to one end of a shaft 70 rockably mounted in the bracket 62. The opposite end of the shaft 70 has fixed thereto a swingable dog 71 provided with an arcuate slot 72, wherefore when the dog 71 is moved from the position shown in Fig. 4 to the position shown in Fig. 7 the shaft 58 will pass into the slot 72 and the dog 71 will be in a position to abut the stop collar 61 (as indicated in Fig. 2) on the shaft 58 when the cross-slide carriage has traveled toward the head a sufficient or predetermined distance.

It will be understood that when the cross-slide carriage is moving toward the head during a threading operation and the dog 71 comes into abutting relationship with the stop collar 61 that then the shaft 58 will be given an endwise movement to rock the lever 57 so as to disengage the clutch in the gear box on the head and stop the rotation of the shaft 23, such endwise movement of the shaft 58 effecting a rocking movement of said shaft due to the threaded portion 58a and nut 60, wherefore the control lever 59 is rocked from an operative position into a neutral position. The end of the shaft 66 opposite to the disk 65 has formed integral therewith a disk 73 carrying a pin 74 which extends into a slot 75 formed in the short arm 76a of a double lever 76, the long arm 76b of which is curved at its upper end as clearly shown in Figs. 6, 7 and 8.

When the lever 67 is moved from the position shown in Fig. 5 to the position shown in Fig. 7, the lever 76b is swung from the position shown in Fig. 6 to the position shown in Fig. 8. It will be noted that in Fig. 6 the feed lever 49 is shown in the feed engaging position, while in Fig. 8 the feed lever is shown in a disengaged position. It will further be noted that when the feed lever is in the feeding or engaged position, as shown in Fig. 6, that the lever 76b cannot swing to the position of Fig. 8, since the lever would abut the feed lever, and hence the lever 67 cannot be moved to engage the half nuts for threading. When the lever 49 is in the disengaged or nonfeeding position then the lever 76b can swing over the feed lever as shown in Figs. 7 and 8, at which time the half nuts will be engaged with the threaded portion 23b of the shaft 23 for the purpose of threading, while the feed lever cannot be moved to a feeding or engaged position because of the lever 76b overlying the feed lever, it being noted that the pin 74 is in horizontal alignment with the center of the shaft 66 and hence the lever 76b is locked in position, and the feed lever cannot be raised and the feed engaged during a threading operation.

Assuming that the machine is operating and a feeding movement is being imparted to the cross-slide carriage, it being understood that the control lever 59 has been moved to establish a drive to the shaft 23, then the parts will be in the position indicated in Figs. 2 to 6 inclusive, at which time the lever 49 will be in feeding position, while the lever 67 will be in the position shown, so that the half nuts 63 and 64 are disengaged and the dog 71 is in an inoperative position. Also at this time the lever 76b will be in the position shown in Fig. 6, that is, its end will be in substantially abutting engagement with the feed lever, wherefore the lever 67 cannot be moved to cause an engagement of the half nuts although the feed lever 49 may be moved freely. It will be noted that the portion 23a of the shaft 23 is of such length that the cross-slide carriage can move with a feeding movement its maximum working distance, that is, from the turret slide to adjacent the head 16, as shown in Fig. 1.

When the cross-slide carriage has attained the position shown in Fig. 1 the gear 24 which drives the feed train in the apron will have reached its most left hand position as shown in Fig. 3. At this time also the half nuts 63 and 64 will be in their most left hand position, as viewed in the drawings, with respect to the threaded portion 23b of the shaft, it being remembered, however, that said nuts are not at this time engaged with the shaft. When the feeding movement has been completed the feed drive may be automatically disengaged, as will be well understood in the art, or the feed drive can be disengaged by manually moving the feed lever 49 from the full line position, as shown in Fig. 2, to the dotted line position, after which the cross-slide carriage can be moved rearwardly by the hand wheel 55a to any desired position depending upon the length of thread to be cut, it being noted that the threaded portion 23b of the shaft 23 is of such length that a thread could be cut equal in length to the maximum travel of the cross-slide carriage. When the cross-slide carriage is in its most rearward position the half nuts 63 and 64 will be located adjacent the right hand end of the threaded portion 23b. Now in order to initiate the threading operation the lever 67 is moved from the position shown in Fig. 5 to the position shown in Fig. 7, and such movement of the lever causes the half nuts to engage the threaded portion 23b of the shaft, acts to swing the dog 71 into operative position with respect to the shaft 58 and stop collar 61, moves the lever 76b from the position shown in Fig. 6 to the position shown in Figs. 7 and 8, at which time the feed lever 49 cannot be raised from the dotted line position of Fig. 2 to the full line position thereof to effect a feeding movement. The control lever 59 is now positioned to establish the drive to the shaft 23, such positioning of the lever moving the shaft 58 endwise toward the right.

The machine is now performing a threading operation and the cross-slide carriage is moved toward the head by the action of the half nuts and the threaded portion 23b, until the dog 71 abuts the stop collar 61 to shift the shaft 58 to the left, as viewed in the drawings, to effect a disengagement of the clutch in the gear box to stop the rotation of the shaft 23. The endwise movement imparted to the shaft 58 acts through the steep threads and the nut 60 to rock said shaft to swing the lever 59 from its operative position to its neutral position.

It will be understood that the stop collar 61 can be positioned at any desired point on the shaft 58, in accordance with the length of the threading operation.

From the foregoing it will be seen that a single shaft is employed for operating the feed drive and for producing the threading movements and that the portion of the shaft which produces the feeding movements and the portion of the shaft which produces the threading movements are integral and so located and of such length that the cross-slide carriage can move its maximum working distance during either a threading movement or a feeding movement. It will also be noted that due to the interlock between the control member for the feeding movements and the control member for the threading movements that the control member for the threading movement cannot be operated during a feeding movement, while the control member for the feeding movement cannot be operated during a threading operation. Likewise, it will be observed that means is provided for automatically stopping the threading operation after a predetermined length of movement of the cross-slide carriage has been effected. In addition it will be seen that a single control member is provided for moving the half nuts into and out of engaged position for positioning the dog which effects the automatic stopping of the threading movement and for positioning the interlock mechanism.

Although a preferred embodiment of the invention has been illustrated and described herein, it will be understood that the invention is susceptible of various modifications and adaptations within the scope of the appended claims.

Having thus described our invention we claim:

1. In a machine tool having a way and a slide movable therealong, a rotatable shaft operatively associated with said slide and having an integral splined non-threaded portion for operating the feed drive to said slide and an integral threaded non-splined portion for moving the slide for threading.

2. In a machine tool having a way and a slide movable therealong, a rotatable shaft operatively associated with said slide and having an integral splined non-threaded portion for operating the feed drive to said slide, and an integral threaded non-splined portion for moving the slide for threading, said portions being of such length that said slide can move its full working distance during either a feeding movement or a threading movement.

3. In a machine tool having a way and a slide movable therealong and provided with an apron, a rotatable shaft having an integral splined non-threaded portion and an integral threaded non-splined portion, means within the apron cooperating with the splined portion of the shaft for producing a feeding movement of said slide, and means exteriorly of said apron and cooperating with the threaded portion of the shaft for producing a threading movement of the slide.

4. In a machine tool having a way and a slide movable therealong and provided with an apron having a feed drive therein, a rotatable shaft having an integral splined non-threaded portion and an integral threaded non-splined portion, a driving member on said splined portion within the apron to actuate the feed drive therein, said apron being provided with an extension, and means housed in said extension for operative association with said threaded portion to produce a threading movement of said slide.

5. In a machine tool having a way and a slide movable therealong and provided with an apron, a rotatable shaft having an integral splined non-threaded portion and an integral threaded non-splined portion, a gear on said splined portion and driven thereby and located within said apron for producing feeding movements of said slide, said apron being provided with an exterior bracket housing a pair of half nuts which cooperate with the threaded portion of said shaft for producing a threading movement of said slide.

6. In a machine tool having a way provided with a slide movable therealong and having an apron carrying a control device for engaging or disengaging the feed drive for said slide, a rotatable shaft having an integral splined non-threaded portion operatively associated with the feed drive for said slide and an integral threaded non-splined portion operatively associated with said slide for producing threading movements thereof, means carried by said apron and adapted to be engaged with and disengaged from said threaded portion for producing threading movements of said slide, a control member for said means, and means interlocking said control member and said control device whereby one is locked in a disengaged position when the other is in an engaged position.

7. In a machine tool having a slide, means for producing a feeding movement thereof, means for producing a threading movement thereof, means for automatically stopping movement of said slide, and a control member for controlling said threading means, for rendering said stopping means operative or inoperative, and for maintaining said feeding means inactive during a threading operation.

8. In a machine tool having a way and a slide movable therealong, means for producing a feeding movement of said slide, a control device for said means, means for producing a threading movement of said slide, a control member for said means, interlocking means between said control device and said control member whereby only one or the other can function at a time, automatic means for stopping said slide after a predetermined movement and operatively associated with said control member to render said means operative or inoperative, said control member controlling the means for producing threading movement, the automatic means for stopping the slide, and the interlocking means between said member and said device.

9. In a machine tool having a slide, means for producing a feeding movement of said slide, means for producing a threading movement of said slide, a threading control member, means including a control lever for controlling the two first named means, and means forming an operative connection between said control member and said control lever whereby said control lever is automatically moved to a neutral position upon the completion of the threading movement, said last means being controlled by said member.

10. In a machine tool having a slide, a rotatable shaft having an integral splined non-threaded portion operatively associated with said slide for producing feeding movements thereof, and an integral threaded non-splined portion operatively associated with said slide for moving the same for threading, means for automatically stopping rotation of said shaft when said slide has moved a predetermined distance, and a control member for controlling the operative association between said slide and said threaded portion of the rotatable shaft and operatively associated with said last named means for rendering the same active or inactive.

11. In a machine tool having a slide, means for producing feeding movements of said slide, a control device for said means, means for producing a threading movement of said slide, a control member for said last named means, means forming an interlock between said control device and said control member and including a rockable lever operatively connected with said control member and movable thereby to a position to render said control device inoperative, and automatic means for stopping said threading means and including an endwise shiftable shaft, a stop collar on said shaft and a swinging dog carried by said slide and operatively associated with said control member and adapted to abut said stop collar when in the active position after a predetermined movement of said slide.

12. In a machine tool having a slide provided with an apron, a rotatable shaft having an integral splined non-threaded portion and an integral threaded non-splined portion, a member located within said apron and operatively associated with said splined portion for producing feeding movements of said slide, said apron having an exterior bracket housing means which cooperates with the threaded portion of said shaft for producing a threading movement of said slide, said member and said means being spaced apart substantially the distance of the maximum working movement of the slide.

WILLIAM J. BURGER.
CHRYSANTH M. MIROSSAY.